US 8,405,659 B2

(12) United States Patent
Lakshmanan et al.

(10) Patent No.: US 8,405,659 B2
(45) Date of Patent: Mar. 26, 2013

(54) SYSTEM AND METHOD FOR ESTABLISHING CORRESPONDENCE, MATCHING AND REPAIRING THREE DIMENSIONAL SURFACES OF ARBITRARY GENUS AND ARBITRARY TOPOLOGY IN TWO DIMENSIONS USING GLOBAL PARAMETERIZATION

(75) Inventors: Geetika T. Lakshmanan, Cambridge, MA (US); James T. Klosowski, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 12/490,732

(22) Filed: Jun. 24, 2009

(65) Prior Publication Data

US 2010/0328311 A1 Dec. 30, 2010

(51) Int. Cl.
*G06T 15/20* (2011.01)
(52) U.S. Cl. ........ 345/427; 345/419; 345/420; 345/423; 345/428; 345/441; 345/442; 345/581; 345/582; 345/584; 345/586; 382/285; 703/2
(58) Field of Classification Search .......... 345/419, 345/420, 423, 427, 428, 441, 442, 581, 582, 345/584, 586, 606; 382/285; 703/2
See application file for complete search history.

(56) References Cited

U.S. PATENT DOCUMENTS

| 8,015,125 B2* | 9/2011 | Regli et al. ............. 706/12 |
| 2006/0013505 A1 | 1/2006 | Yau et al. |
| 2006/0267978 A1 | 11/2006 | Litke et al. |
| 2009/0128556 A1* | 5/2009 | Fischer et al. ............. 345/420 |
| 2009/0303230 A1* | 12/2009 | Liu et al. ............. 345/419 |

OTHER PUBLICATIONS

A. Lee, D. Dobkin, W. Sweldens, and P. Shroder, "Multiresolution mesh morphing", Proceedings of SIGGRAPH 99 (Aug. 1999), Computer Graphics Proceedings, Annual Conference Series, pp. 343-350.
E. Praun, W. Sweldens, and P. Shroder, "Consistent mesh parameterizations", Proceedings of ACM SIGGRAPH 2001 (Aug. 2001), Computer Graphics Proceedings, Annual Conference Series, pp. 179-184.

(Continued)

*Primary Examiner* — Kimbinh T Nguyen
(74) *Attorney, Agent, or Firm* — Scully, Scott, Murphy & Presser, P.C.; William Stock, Esq.

(57) ABSTRACT

A system, method and computer program product for parameterizing a 3D surface of genus g and arbitrary topology to the 2D plane. The method includes receiving an input 3D mesh of genus g; computing n discrete harmonic one-forms on the surface of the mesh to obtain n numbers for every edge in the graph represented by an input mesh; selecting two compatible linearly independent discrete harmonic one-forms for parameterization; assigning an arbitrary vertex in the mesh as an origin, and then summing each of the two harmonic one-forms along the edges of the graph using a traversal strategy to form 2D coordinates for every other vertex of the mesh to form the 2D parameterization of the 3D surface; detecting all singularities in the 2D parameterization; and, removing faces connected to the singularity and parameterizing the vertices of the removed faces using a 2D parameterization method, and connecting these vertices using a 2D polygonalization algorithm. Using the 3D mapping methodology employed, a correspondence function is computed that can be used to match two 3D object surfaces and repair meshes of arbitrary genus.

23 Claims, 10 Drawing Sheets

OTHER PUBLICATIONS

V. Kraevoy and A. Sheffer, "Cross-parameterization and compatible remeshing of 3D models", ACM Transactions on Graphics 23, 3 (Aug. 2004), pp. 861-869.

J. Schreiner, A. Asirvatham and E. Praun, "Inter-surface mapping" ACM Transactions on Graphics 23, 3, 2004, pp. 179-184.

B Allen, B. Curless and Z. Popovic, "The space of human body shapes: reconstruction and parameterization from range scans", ACM Transactions on Graphics 22, 3 (Jul. 2003), 587-594.

L. Zhang, N. Snavely, B. Curless and S.M. Seitz, "Spacetime faces: high resolution capture for modeling and animation", ACM Transactions on Graphics 23, 3 (Aug. 2004), pp. 548-558.

Nathan Litke, Marc Droske, Martin Rumpf and Peter Schroder, "An Image Processing Approach to Surface Matching", Proceedings of the Symposium on Geometry Processing 2005.

Zhang et al., "Harmonic maps and their applications in surface matching", CVPR99, pp. 524-530, (1999).

Wang et al., "High resolution tracking of non-rigid 3d motion of densely sampled data using harmonic maps", ICCV05, pp. I: 388-395 (2005).

Sharon et al., "2d-shape analysis using conformal mapping", CVPR04, pp. II: 350-357, (2004).

Wang et al., "Conformal Geometry and Its Applications on 3D Shape Matching Recognition, and Stitching", IEEE Trans. Pattern Anal. Mach. Intell. 29(7): 1209-1220 (2007).

Wang et al., "3D Surface Matching and Recognition Using Conformal Geometry", CVPR (2) 2006: 2453-2460.

Gu et al., "Global Conformal Surface Parameterization", Eurographics Symposium on Geometry Processing, 2003.

* cited by examiner

SYSTEM AND METHOD FOR ESTABLISHING CORRESPONDENCE, MATCHING AND REPAIRING THREE DIMENSIONAL SURFACES OF ARBITRARY GENUS AND ARBITRARY TOPOLOGY IN TWO DIMENSIONS USING GLOBAL PARAMETERIZATION

BACKGROUND

The invention relates generally to the analysis of surfaces and to surface parameterizations, and in particular, to an improved method, apparatus, and article of manufacture for repairing, matching and establishing a correspondence function between two three dimensional surfaces of arbitrary genus that implements global parameterization of the surfaces and maps them both onto a 2D plane.

As known in the analysis of geometric surfaces, a "correspondence" between two surfaces is a function that maps one surface onto the other. A "genus" means the number of holes in the surface. FIG. 1 shows example 3D objects 15a-15b each of a respective indicated genus 12 that is greater than 1 as depicted.

However, currently, there is no way to establish a correspondence function in two dimensions between two three dimensional surfaces of arbitrary genus, that can be used for data fitting, morphing, and mapping textures between surfaces. Moreover, there is no way to map two three dimensional surfaces of arbitrary genus into two dimensions that can be used to match two (2) three-dimensional (3D) surfaces of arbitrary genus for use in 3D object recognition, shape registration, and classification applications. Performing the operation in two dimensions results in a number of benefits including faster processing than in three dimensions.

One class of methods in 3D surface correspondence use parameterizations of meshes over a common parameter domain to establish a direct correspondence between them. These methods either typically require user supplied feature correspondences such as described in the reference to A. Lee, D. Dobkin, W. Sweldens, and P. Shroder entitled "Multiresolution mesh morphing", in Proceedings of SIGGRAPH 99 (August 1999), Computer Graphics Proceedings, Annual Conference Series, pp. 343-350 and, in the reference to E. Praun, W. Sweldens, and P. Shroder entitled "Consistent mesh parameterizations" in Proceedings of ACM SIGGRAPH 2001 (August 2001), Computer Graphics Proceedings, Annual Conference Series, pp. 179-184 (both incorporated by reference) or, have complex algorithms to properly align the selected features during the parameterization process (see, e.g., the reference to V. Kraevoy and A. Sheffer entitled "Cross-parameterization and compatible remeshing of 3D models" in ACM Transactions on Graphics 23, 3 (August 2004), 861-869 and, the reference to J. Schreiner, A. Asirvatham and E. Praun entitled "Inter-surface mapping" ACM Transactions on Graphics 23, 3, 2004, pp 179-184, both incorporated by reference). Furthermore, the combinatoric complexity of the input meshes determines the performance of these methods, which can be quite costly (on the order of hours). The final matching can only be controlled by changing the parameteric domain layout.

Another class of methods matches a template surface to range scan data directly in 3D such as described in the reference to B Allen, B. Curless and Z. Popovic entitled "The space of human body shapes: reconstruction and parameterization from range scans" in ACM Transactions on Graphics 22, 3 (July 2003), 587-594 and in the reference to L. Zhang, N. Snavely, B. Curless and S. M. Seitz entitled "Spacetime faces: high resolution capture for modeling and animation" in ACM Transactions on Graphics 23, 3 (August 2004), 548-558. These algorithms require manual 3D alignment and the surfaces must be in similar poses in order to accurately match them on the basis of surface normals.

One known approach proposes a fast multiresolution strategy to match 3D surfaces by mapping the surfaces to the 2D domain and applies well-established matching methods from image processing in the parameter domains of the surfaces (See, e.g., the reference to Nathan Litke, Marc Droske, Martin Rumpf and Peter Schröder entitled "An Image Processing Approach to Surface Matching" in Proceedings of the Symposium on Geometry Processing 2005). This approach has one major limitation: This technique assumes that the surfaces to be matched must be homeomorphic to a disk. A significant number of additional and non-obvious algorithmic steps would be necessary to apply this technique to determine correspondences between surfaces of arbitrary genus.

A large body of work in shape matching is devoted to the concept of developing shape descriptors. The general approach of these methods is to define a mapping from the space of models into a fixed dimensional vector space, and then to define the measure of similarity between two models as the distance between their corresponding descriptors. Shape descriptor methods allow a correspondence-based measure of similarity to be obtained without the overhead of explicitly establishing the correspondences. While 2D shapes have a natural arc length parameterization, 3D surfaces of arbitrary genus do not. As a result, common shape descriptors for 2D contours cannot be extended to 3D surfaces, and computationally efficient matching algorithms based on dynamic programming cannot be applied to 3D objects. Another problem is the higher dimensionality of 3D data, which makes registration, finding feature correspondences, and fitting model parameters more expensive. As a result, methods that match shapes using geometric hashing or deformations are more difficult in 3D.

One major challenge that 3D shape descriptor approaches have to address is that a 3D model and its images under a similarity transformation are considered to be the same in 3D shape matching. 3D Shape matching techniques based on shape descriptors have to as a result of this make adjustments in two possible ways: (1) Choose a mapping that is invariant to similarity transformation, so that the same shape descriptor is defined for every orientation of the model; and, (2) Compute the shape descriptor of an alignment normalized version of the model by normalization that is accomplished by placing the model into its own canonical coordinate system. Obtaining rotationally invariant representations is a known technique. A method to separate anisotropy from the shape matching equation is known, however, the method does not work well for highly anisotropic models.

Existing methods for 3D shape matching that rely on local shape signatures include curvature-based shape representations, regional point representations, shape distributions, spline representations and harmonic shape images. Such shape representations that use local shape signatures are not stable, sensitive to resolution changes, and do not perform well in the face of occlusion and noise.

Due to the difficulty of the 3D shape matching problem, several known methods reduce the problem to a 2D image matching problem. Zhang et al. propose harmonic maps for surface matching (See Zhang et al. reference entitled "Harmonic maps and their applications in surface matching". In CVPR99, pages 524-530). Wang et al., in their reference entitled "High resolution tracking of non-rigid 3d motion of densely sampled data using harmonic maps" in ICCV05, pages I: 388-395 (2005), use harmonic maps to track dynamic 3D surfaces. There is a large body of work on conformal maps for face and brain surface matching. Sharon et al., in their reference entitled "2d-shape analysis using conformal mapping" in CVPR04, pages II: 350-357, (2004) describes a method for analyzing similarities of 2D shapes using conformal maps. The main drawback of these solutions is that in order to calculate harmonic maps, the surface boundary needs to be identified, and a boundary mapping from 3D surfaces to the 2D domain needs to be created.

Some techniques do not require boundary information. For example, the technique described in references to Wang et al. entitled "Conformal Geometry and Its Applications on 3D Shape Matching Recognition, and Stitching" in IEEE Trans. Pattern Anal. Mach. Intell. 29(7): 1209-1220 (2007) and, entitled "3D Surface Matching and Recognition Using Conformal Geometry" in CVPR (2) 2006: 2453-2460 makes use of conformal geometry theory and maps the 3D surface to the 2D plane through a global optimization. The main limitation of this technique is that it is applicable only to surfaces homeomorphic to a disk. The method does not address the case when the input surfaces to be matched are of genus greater than one, and it will fail to correctly compute a matching if applied as is.

Thus, it would be highly desirable to provide a system and method for matching and establishing correspondences between three dimensional surfaces of arbitrary genus and topology in two dimensions.

BRIEF SUMMARY

The present invention is a novel system and method for matching and establishing correspondences between three dimensional surfaces of arbitrary genus and repairing and manipulating three dimensional surfaces.

The system and method simplifies this three dimensional problem to two dimensions by applying a global parameterization of the three dimensional surface onto the two dimensional plane by computing two linearly independent discrete harmonic one-forms on the surface.

Furthermore, the system and method outlines a strategy to address singularities that occur in parameterizations of surfaces of genus greater than one. Singularities are characterized by the parameterization not being injective. Double wheel vertices are one known manifestation of such singularities. Doubly-convex faces is another known manifestation of such singularities. Finally, the method provides details on how three dimensional surfaces of arbitrary genus can be repaired, matched and furthermore a correspondence function can be established between them once they are mapped to the 2D plane.

Unlike most other known solutions for surface matching that reduce the three dimensional surface to two dimensions, the present invention is applicable to surfaces of genus greater than one.

According to one aspect of the present invention, there is provided a system, method and computer program product for parameterizing a 3D surface of genus g and arbitrary topology to the 2D plane. The method steps comprise: receiving an input 3D mesh of genus g; computing n discrete harmonic one-forms on the surface of the mesh to obtain n numbers for every edge in the graph represented by an input mesh; selecting two compatible linearly independent discrete harmonic one-forms for parameterization; assigning an arbitrary vertex in the mesh as an origin, and then summing each of the two harmonic one-forms along the edges of the graph using a graph traversal strategy to form 2D coordinates for every other vertex of the mesh to form the 2D parameterization of the 3D surface; detecting all singularities in the 2D parameterization; and, removing and replacing the singularities, the removing comprising: removing faces connected to the singularity and the replacing comprising: parameterizing the vertices of the removed faces using a 2D parameterization method and connecting these vertices using a 2D polygonalization algorithm.

Further to this aspect of the invention, the 3D mesh can represent a 3D surface that is topologically correct (manifold) or is not topologically correct (non-manifold).

Moreover, further to this aspect of the invention, the detecting of singularities comprises identifying all double wheel vertices in the 2D parameterization. For the manifold case, the detecting all double-wheel vertices comprises: traversing each vertex of the 2D parameterization and computing the winding number of each vertex, the double wheel existing at a vertex whose winding number is greater than or equal to 360 degrees. For the manifold case, detecting doubly convex faces comprises iterating over all faces and testing whether any of their sides intersect with sides of other faces. For the non-manifold case, the detecting all double-wheel vertices or doubly convex faces comprises: iterating over all faces of the 2D plane; and, determining if a vertex that is within diameter k of the face in 3D space, lies inside the face in the 2D plane and is not connected to any of the polygon's vertices, and if so, identifying a region centered around the vertex as part of a double wheel vertex or a doubly convex face.

Moreover, by utilizing a global parameterization method based on discrete harmonic one-forms, according to the invention, a mapping of 3D surface into 2D produces a numerical measure of similarity between two 3D surfaces that are mapped to 2D using the method. Further, the mapping into 2D produces a correspondence that allows one 3D surface to be mapped to a second 3D surface or vice versa, when both surfaces are mapped into 2D. The mapping of a 3D surface into 2D according to the method of the invention allows one to repair a topologically incorrect surface when it is mapped into 2D. Additionally, the mapping of the surface to 2D is obtained in a locally non-overlapping manner if the surface is a manifold and, further, such that the mapping of the surface to 2D isolates the distortion introduced by a global mapping to a finite number of locations in 2 dimensions if the surface is a manifold.

Moreover, by utilizing a global parameterization method based on discrete harmonic one-forms, according to the invention, a matching algorithm, has the following benefits: 1) The algorithm can compare surfaces of different resolution; 2) The algorithm is more robust to noise in the input models than other known solutions; 3) The algorithm does not require specification of the mesh boundary; 4) The algorithm can compare meshes with n sided polygons, not just triangulated meshes; and, 5) The algorithm does not require alignment normalization or similarity transformation invariance, both of which are necessary for computing accurate shape descriptors for 3D models.

Thus, unlike the only other known global parameterization based approaches for matching surfaces of arbitrary genus and establishing correspondences between them, the methods employed in the present invention has the following advantages: 1) it applies to manifolds as well as non-manifold surfaces; 2) it is applicable to input meshes with any sided polygons and interior angles; 3) it outlines explicit steps to detect, eliminate and replace "double-wheel" vertices and/or "doubly-convex" faces in the parameterization that occur when the surface parameterized is of genus greater than one; 4) it guarantees that there are no flips in the parameterization for manifold surfaces of genus one. For manifold surfaces of genus greater than one, the method guarantees that the parameterization is locally injective; 5) it does not explicitly rely on Gaussian curvature to detect surface matching and uses a metric for surface matching that is generic, and includes other embodiments; and, 6) the detecting of double-wheels and/or doubly convex faces is linear in the number of faces of the 3D surface, whereas the other prior art method is linear in the number of vertices of the 3D surface. Since the number of triangles of a surface are strictly less than the number of vertices, the method of the present invention is faster.

Thus, advantageously, the present method can be applied to novel applications such as mesh repair and artistic manipulation.

DETAILED DESCRIPTION

Figure 1:
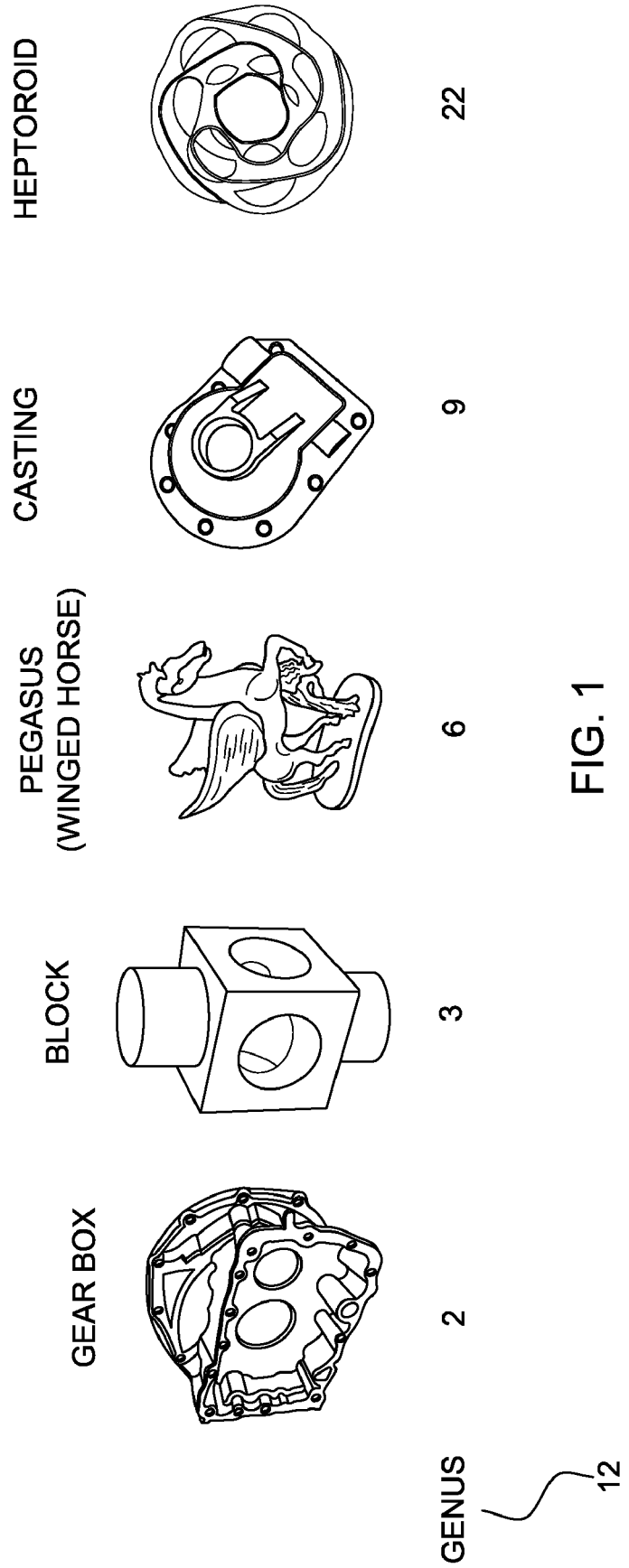
FIG. 1 illustrates example 3D surfaces of objects having different postures textures and different genuses (different number of holes in the 3D object)
Figure 2:
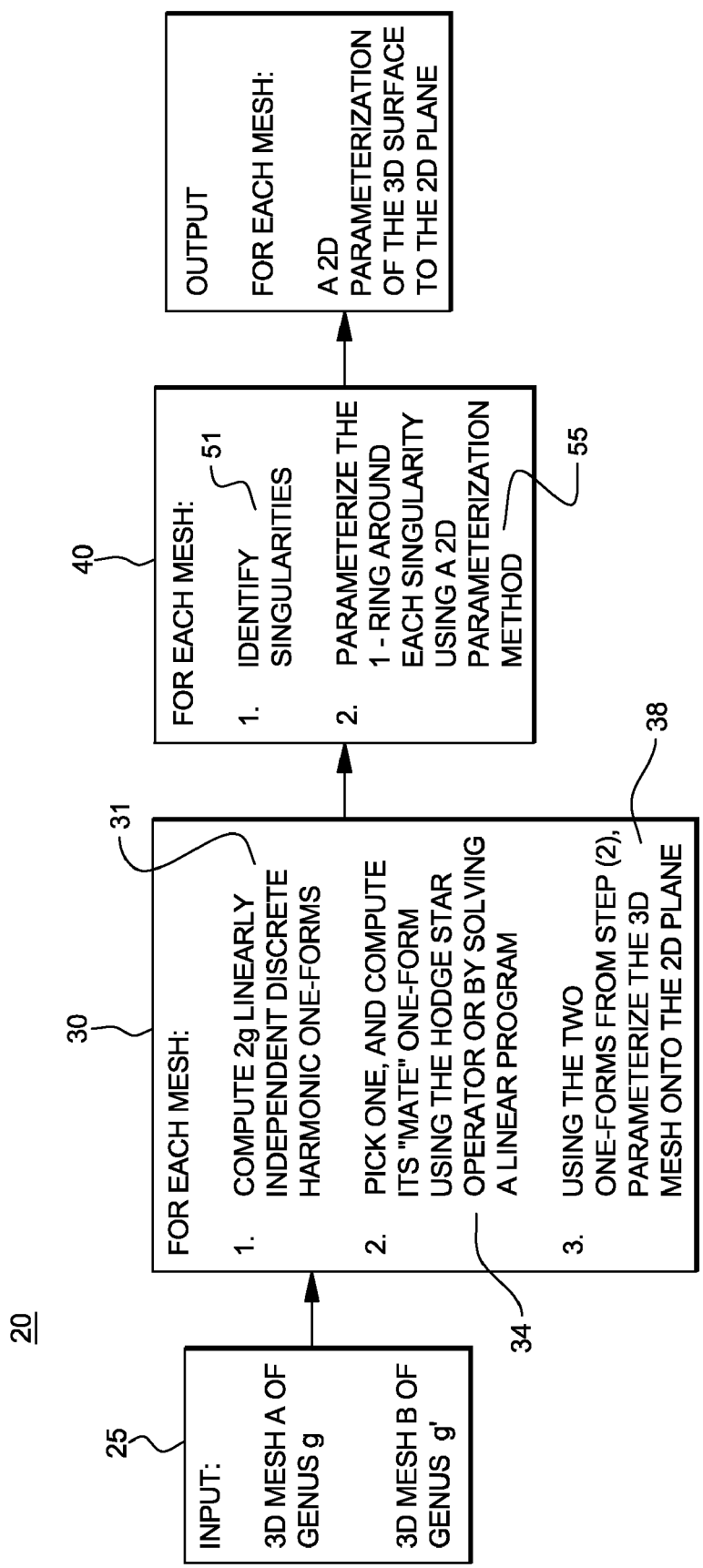
FIG. 2 illustrates a flow diagram depicting the steps for computing a parameterization of a surface of genus g, and identifying and removing singularities that arise as a result of parameterizing using discrete one-forms according to the present invention.
Figure 7:
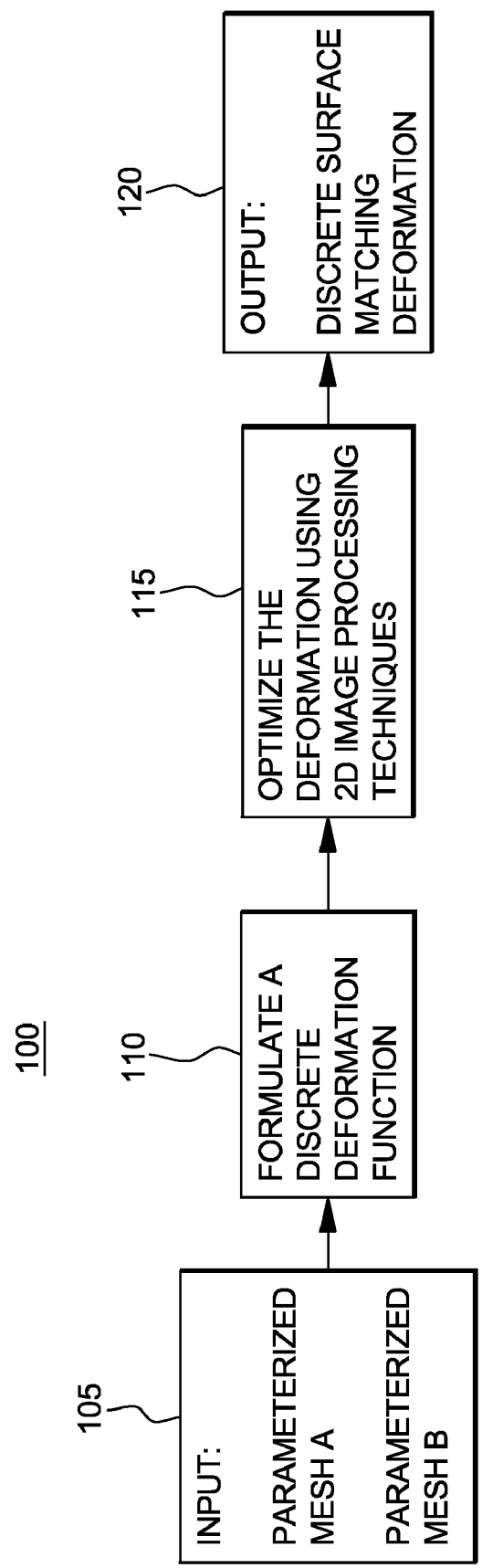
FIG. 7 illustrates a flow diagram of the algorithm for computing a surface deformation from two parameterized 3D meshes corresponding to 3D parameterized surfaces of genus g computed in accordance with the present invention.
Figure 8:
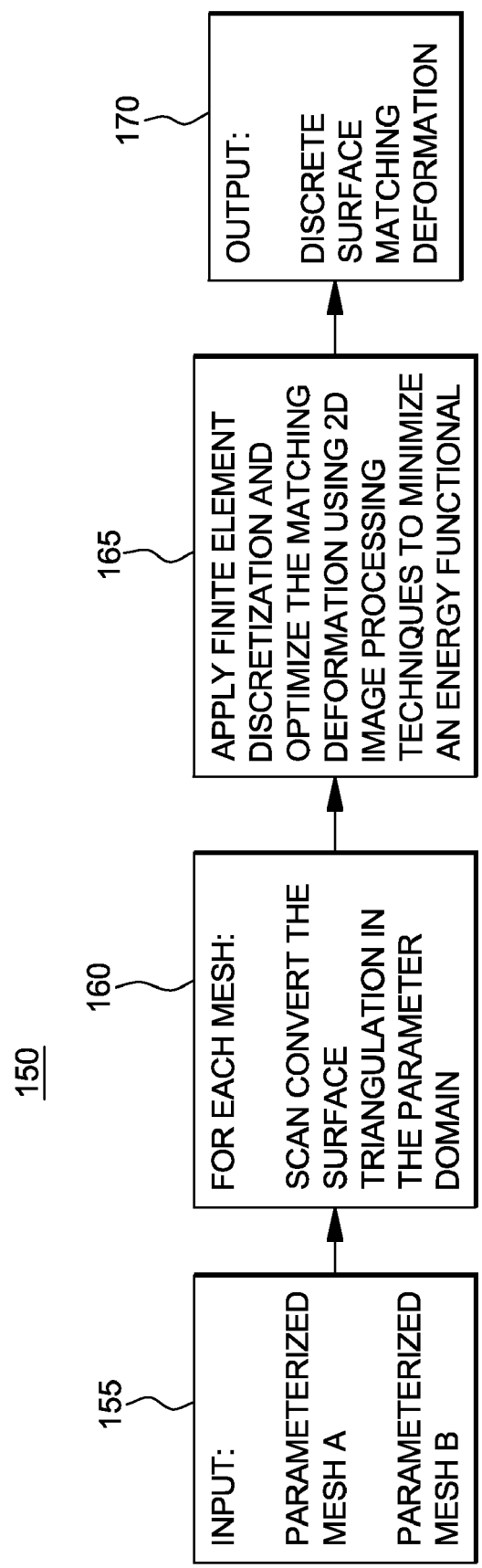
FIG. 8 illustrates the method for constructing a correspondence function for computing a surface deformation from two parameterized 3D meshes corresponding to 3D parameterized surfaces of genus 2; and, FIG. 9 summarizes the steps for matching two surfaces after parameterizing them in 2D.
Figure 9:
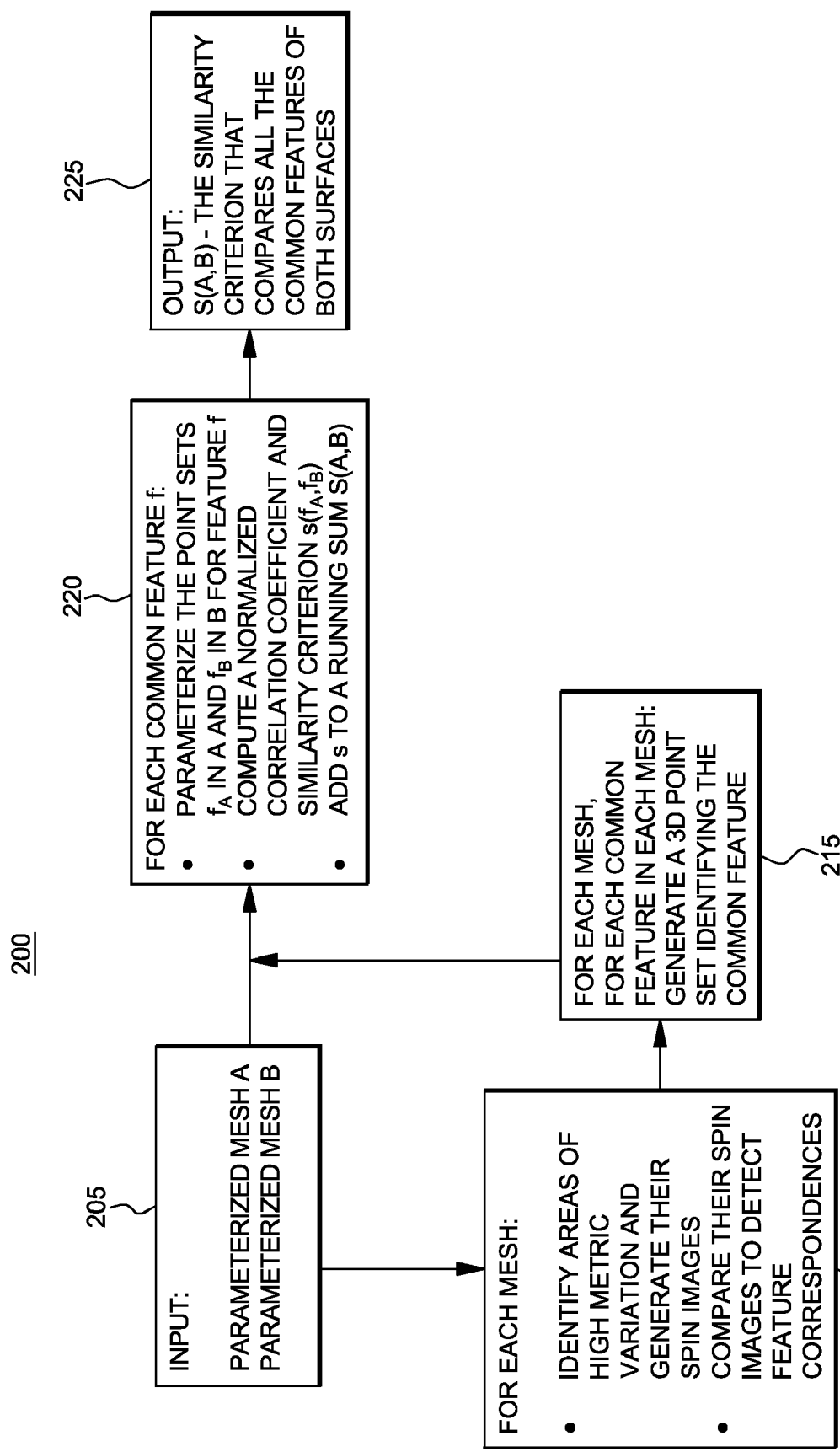
Figure 11:
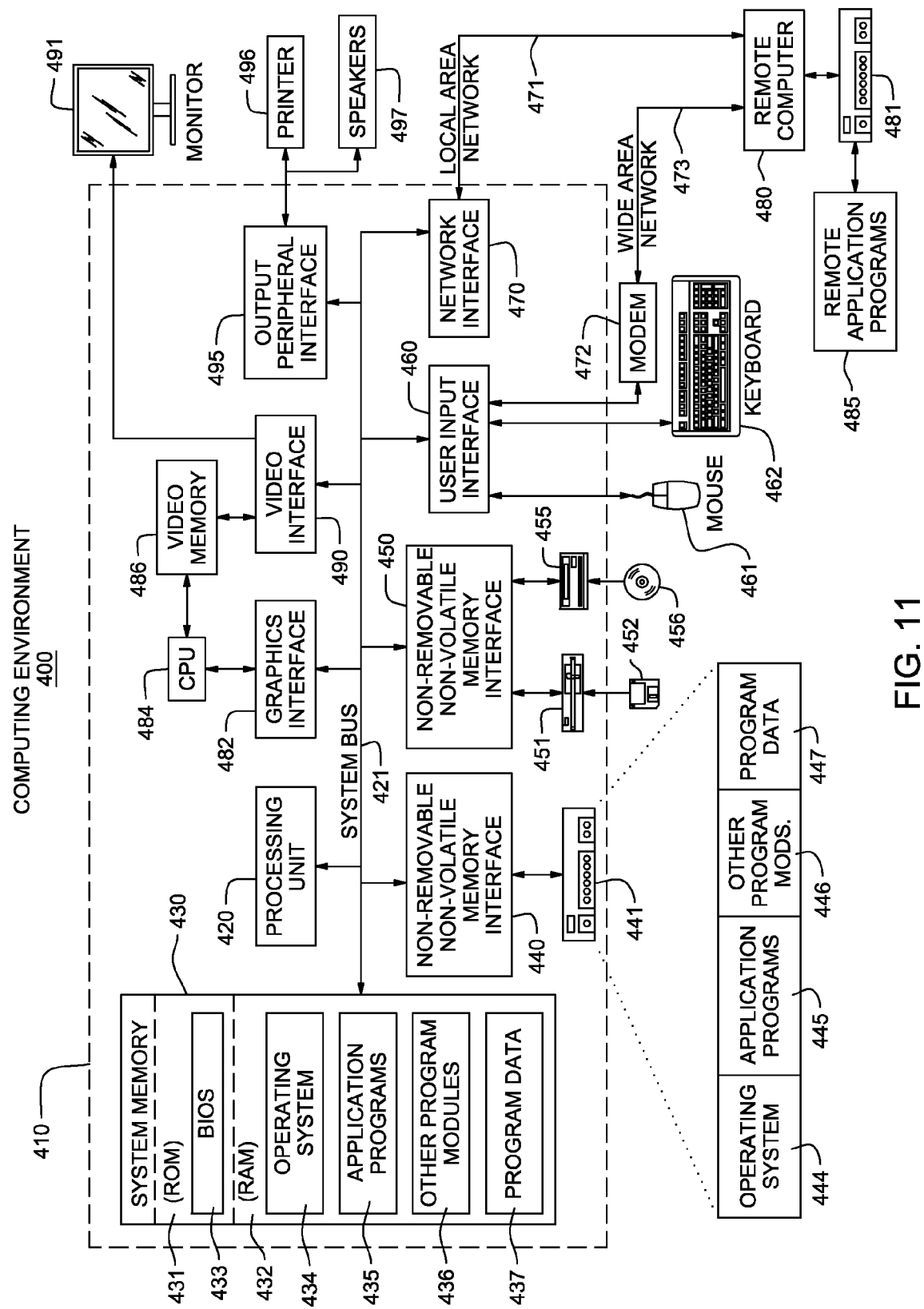

FIG. 2 illustrates a flow diagram 20 depicting the method steps for performing global parameterization according to the present invention. FIG. 2 particularly illustrates the pipeline for parameterization including computing a parameterization for input 3D input surfaces 25, e.g., 3D Mesh A and 3D Mesh B each of genus "g". The output mapping from the steps outlined in FIG. 2 serves as the input for the methods outlined in FIGS. 7-9 depicting the method steps employed in computing a correspondence function between the two input surfaces by applying matching methods from image analysis in the parameter domain (FIGS. 7 and 8), and depicting the steps in obtaining a shape representation that can be used to match the input surfaces (FIG. 11).

The method for parameterizing an input surface of genus g to the plane according to the invention is depicted at step 30 and includes computing discrete harmonic one-forms on the surface of the mesh as shown implemented at step 31, FIG. 2. This involves a series of processes that will be described in connection with the manifold case, and then the processes are described for the non-manifold case.

Parameterizing a n-polygonal-faced representation of a 3D object, i.e., a mesh, to a plane involves solving a system of equations for values attached to the edges of a graph. These values represent the difference in parameter values between the two vertices (points) incident on that edge. Values defined on the edges of a graph are also known as a discrete one-form (or 1-simplex), in analogy to the continuous one-forms used in differential geometry. Discrete harmonic one-forms includes one whose faces are all closed as shown by an example 37 of FIG. 3B and one having all vertices co-closed with respect to some set of weights as shown by example 39 of FIG. 3C.

Figure 3A:
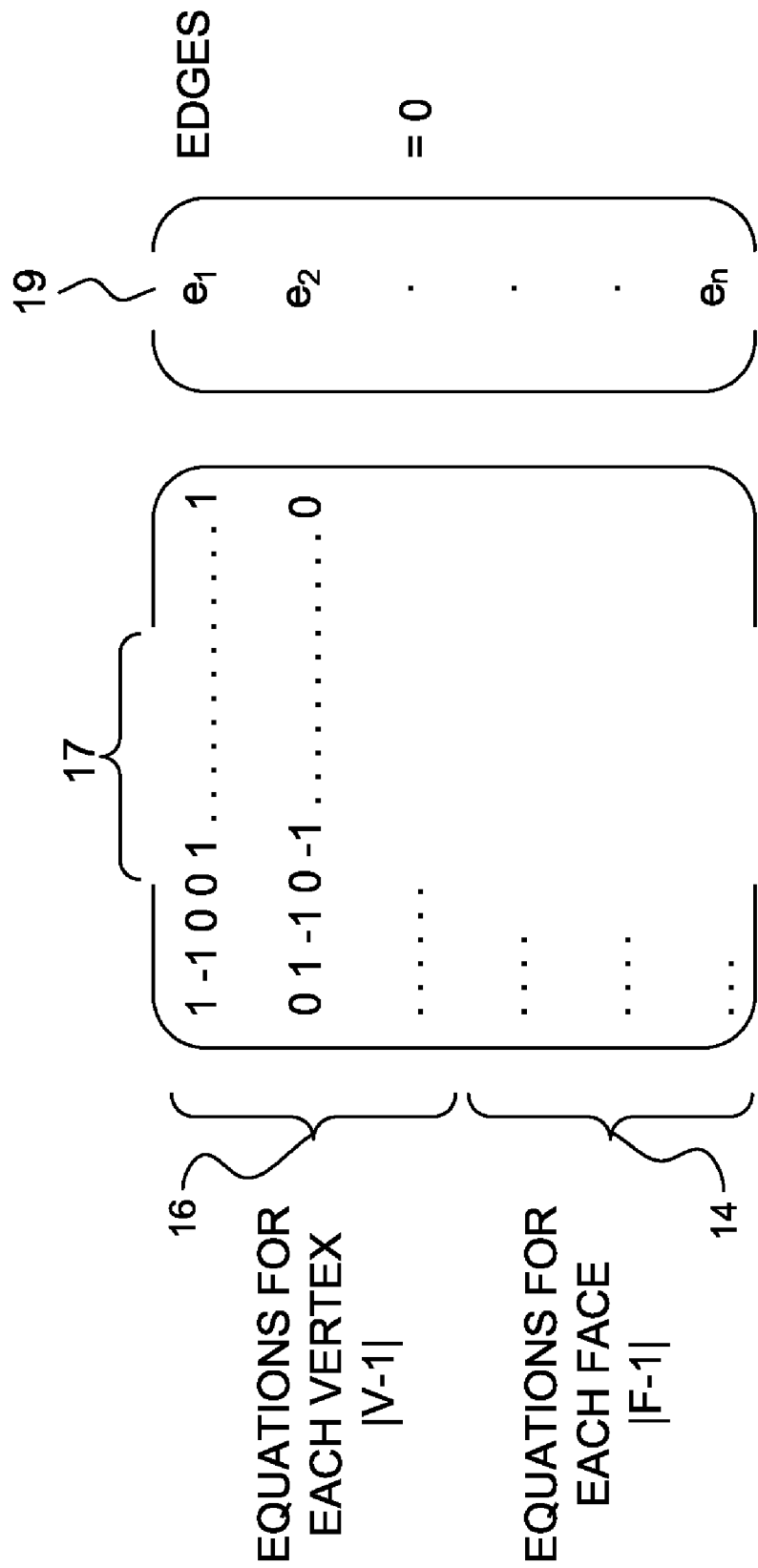
FIG. 3A illustrates an example computation of n linearly independent discrete harmonic one-forms on meshes.
Figure 3C:
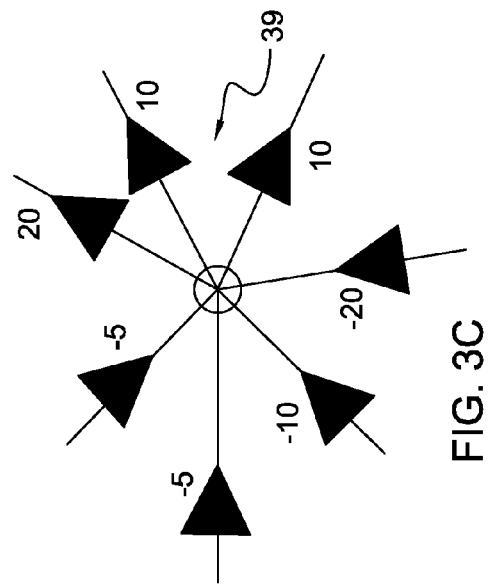
FIG. 3B illustrates an example discrete harmonic one-form whose faces are all closed and, FIG. 3C illustrates an example discrete harmonic one-form having all vertices co-closed with respect to some set of weights.
Figure 3B:
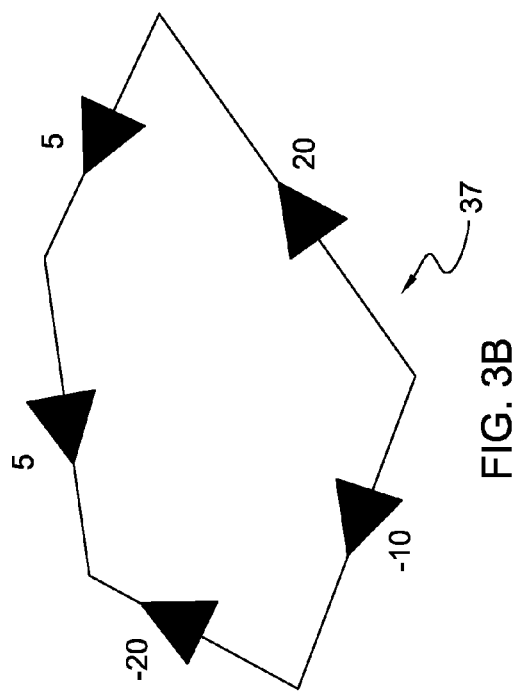

The computation of 2g linearly independent discrete harmonic one-forms on meshes for the manifold case as depicted at step 31, in FIG. 2, is now described in connection with FIG. 3A. As shown in FIG. 3A, in one embodiment, the computation includes creating a sparse coefficient matrix 17 representing equations 16 for the closedness of all faces of the mesh, and equations 14 representing the co-closedness of all vertices (points) in a mesh. In the matrix 17, each row is an equation. As shown in FIG. 3A, the unknown column matrix 19 are the unknown edges $(e_1, \ldots e_n)$ on the mesh and these will be being summed over edges of a face or the edges leaving from a point, i.e., vertex on the mesh, such that when the system of equations is solved, a value of every edge (e) is obtained. Using that edge value (e), an algorithm is then used to map every 3D point to the 2D plane. Cotangent weights can be used in the matrix to attain one-forms that lead to a conformal mapping. Harmonic one-forms are generated by computing an orthogonal basis of the two dimensional null-space of this matrix. This is achieved by running a nullspace computation procedure, e.g., by inverse iteration on the matrix, which can be done efficiently using sparse LU factorization. The final result is 2g numbers for every edge 19 in the graph represented by the input mesh. This technique guarantees that the parameterization resulting from the one-forms is globally injective for surfaces of genus one.

Returning to FIG. 2, two discrete harmonic one-forms are then selected as shown implemented at step 34, FIG. 2. For meshes of genus one or greater, implementation of step 31 will result in at least two linearly independent harmonic one-forms that are needed for parameterization. The first discrete harmonic one-form is picked randomly from the 2g solutions in step 31. The second one is compatible with the first one, and is henceforth referred to as the "mate" one-form. In one embodiment, computing a mate one-form includes implementing a Hodge Star operator such as described in the reference to X. Gu and S.-T. Yau entitled "Global conformal surface parameterization" in Proceedings of Symposium on Geometry Processing, pages 127-137, (2003). Application of the Hodge Star operator can lead to flips in the parameterization. A linear program may be solved in order to obtain the second "mate" one-form that guarantees that there will be no flips locally in the parameterization and that the parameterization is locally injective.

As further depicted in FIG. 2, using the two discrete one-forms from step 34, the next step 38 involves parameterizing the 3D mesh onto the 2D plane.

Figure 4:
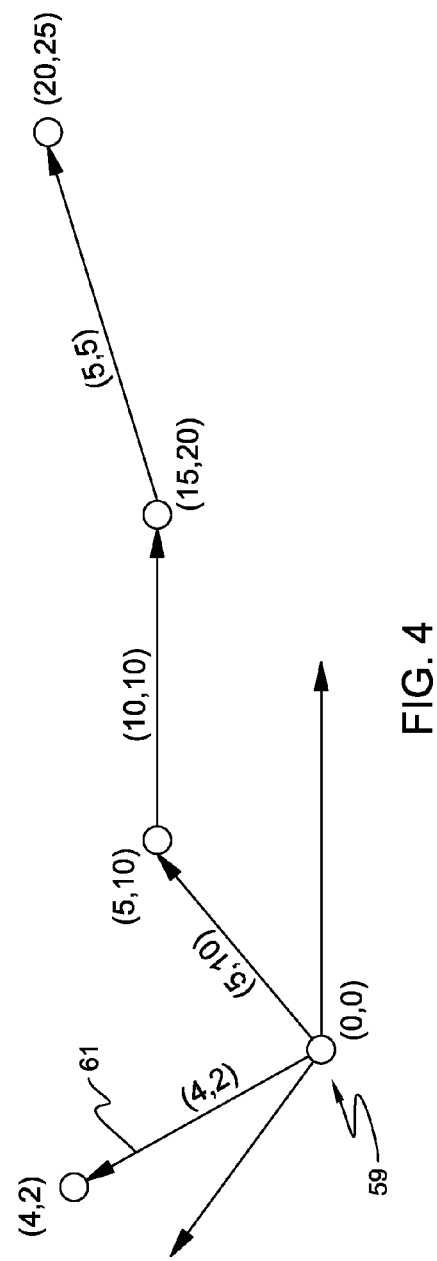
FIG. 4 illustrates the integration of the one-form values along the edges of the mesh to assign 2D coordinates to each vertex in the mesh.

FIG. 4 depicts the parameterization step for an example mesh portion including assigning an arbitrary vertex 59 in the mesh with origin coordinates, e.g., coordinate (0,0), and then integrating (summing) each of the two one-forms along the edges 61 of the graph using any traversal strategy (Breadth First Search (BFS) or Depth First Search (DFS)) to form 2D coordinates for every other vertex. A parameterization procedure involving the integration is described in the reference to S. J. Gortler, C. Gotsman, and D. Thurston entitled "Discrete one-forms on meshes and applications to 3d mesh parameterization" in Computer Aided Geometric Design, 33(2):83-112, (2006). Thus, every other vertex in the mesh is assigned 2D coordinates. Due to the closedness of the faces, these numbers are independent of the integration path.

In this first embodiment, as mentioned, FIG. 2 addresses the series of steps in connection with the manifold case. In the case of 3D Manifolds of genus greater than one the invention seeks to remove and replace all singularities arising in the form of double wheel vertices resulting from the parameterization.

Figure 5B:
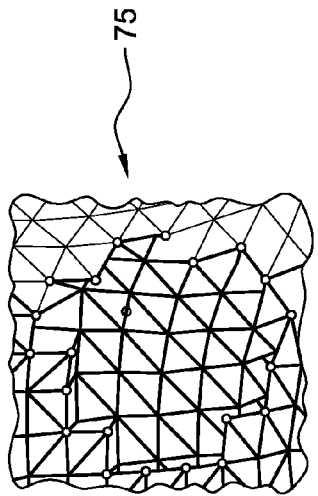
FIG. 5B shows an example of an actual double-wheel vertex in an example parameterized 3D surface.
Figure 6B:
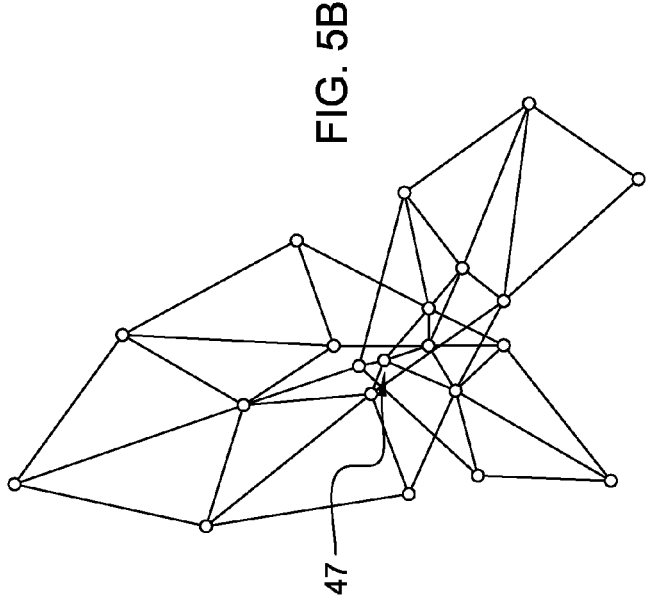
FIG. 6B depicts the 2D parameterized view of a portion of the 3D mesh surface of FIG. 6A and the resulting corresponding hole having a set of interior vertices obtained after removing faces connected to the singularity.
Figure 5A:
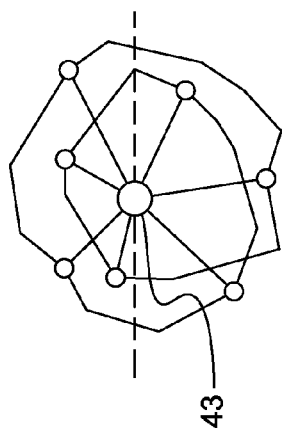
FIG. 5A illustrates an example of double-wheel vertex, the double wheel vertex being the large vertex in the center.

FIG. 5A shows an example of a double-wheel vertex, the double wheel vertex being the large vertex 43 in the center. FIG. 5B shows an example of a corresponding actual double-wheel vertex 47 in a parameterized 3D surface. A discretized version of the Poincare-Hopf index theorem, such as described in "Differential Topology" by V. Guillemin and A. Pollack (Prentice-Hall, Englewood Cliffs, N.J., 1974), incorporated by reference as if fully set forth herein, applies to harmonic one-forms on closed meshes of genus one and higher. According to the Index theorem, the sum of all indices of all vertices and faces in a closed manifold mesh of genus g must be a value of 2g−2. This means that a manifold mesh of genus g parameterized by discrete harmonic one-forms will have 2g−2 vertices that are doubly wheel, where the co-boundary edges will cycle around the vertex twice and/or doubly convex faces, where the boundary edges cycle around the face twice. Therefore, the parameterization will not be injective at exactly 2g−2 locations. However, according to the invention, the following process steps indicated at step 40, FIG. 2, are implemented to remove and replace singularities that include the double wheel vertices and doubly-convex faces in this parameterization:

In FIG. 2, in a first process step 51, all singularities are identified. Double-wheel vertices can be identified by computing the winding number of each vertex. Any vertex whose winding number is greater than 360 degrees is a double wheel. Doubly convex faces can be identified by iterating over all faces in the surface and testing whether any of their sides intersect with sides of other faces. Then, all vertices and faces in each singularity are removed and replaced. By removing all faces in the mesh connected to a singularity, holes in the parameterization as well as a set of interior vertices for each hole are obtained. This is illustrated for a particular example of genus 2 (two-holed torus) shown in FIG. 6A where an example singularity 72 (i.e., a vertex that is inside a triangle and is not connected to any of the vertices of the triangle) leading to existence of a double wheel is computed at the 3D mesh surface, and a corresponding hole 75 having a set of interior vertices, is obtained in the 2D parameterized view of FIG. 6B by removing all faces connected to the double wheel vertex. Then, the process re-parameterizes each of the interior vertices in each hole by computing a Tutte parameterization as indicated at 55, FIG. 2. A Tutte parameterization is computed by solving a linear system in which the coordinates of each interior vertex are some arbitrary convex combination of the position of its neighbors and the coordinates of the boundary vertices are coordinates of vertices of a convex polygon. By selecting a vertex along the boundary 71 of each hole and traversing the boundary of the hole and checking for which faces are not covered by a face on each side, the set of boundary vertices for each hole is computed as shown in FIG. 6B. A Tutte parameterization for the boundary and interior vertices of each hole is then computed by assigning each boundary vertex coordinates along a circle, the linear system just described is solvable. Then, there is next employed the step of polygonolizing the point sets in each hole. This will provide a polygonalized 2D surface to cover the holes.

The foregoing describes the parameterization algorithm for 3D input surfaces for the manifold case (i.e., topologically correct). What now follows is a description of the parameterization algorithm for 3D input surfaces for the non-manifold case (i.e., topologically incorrect) 3D surface.

For the Non-Manifold 3D Surfaces, a process is now described for computing discrete harmonic one-forms.

As in the prior manifold 3D Surface case, n linearly independent discrete harmonic one-forms is computed for the non-manifold case where n could be greater than 2g or less than 2g. Referring back to FIG. 2, this includes step 31 of computing discrete harmonic one-forms on meshes. One such method includes creating a sparse coefficient matrix representing equations for the closedness of all faces of the mesh and the co-closedness of all vertices in a mesh. In one implementation, cotangent weights are used to attain one-forms that lead to a conformal mapping. Harmonic one-forms can be generated by computing an orthogonal basis of the two dimensional null-space of this matrix, e.g., by running a nullspace computation procedure, e.g. by inverse iteration on the matrix, which can be done efficiently using sparse LU factorization. The final result is n numbers for every edge in the graph represented by the input mesh. For the non-manifold case less than 2g one-forms or more than 2g one-forms may result, or no solutions may result. If there are no solutions, the method quits. If there are two or more solutions, the process continues.

Further, referring back to FIG. 2, as in the prior manifold 3D surface case, two discrete harmonic one-forms are selected for the non-manifold case as indicated at step 34. For meshes of genus one or greater, step 31 results in at least two linearly independent harmonic one-forms. Two harmonic one-forms are needed for parameterization. The first one is randomly picked from the n solutions in step 31. The second one (referred to as the "mate" one-form) must be found that is compatible. In the non-manifold case, there are a number of ways to compute a mate one-form, including a linear program that specifies linear constraints to describe the mate one-form, e.g., the sum of all the areas of faces in the input mesh should be strictly positive and all areas should have the same sign.

Then there is implemented, for the non-manifold case, parameterizing the 3D input surface in the 2D plane using the two one-forms. Thus, as depicted in FIG. 2, step 38, using the two one-forms, the parameterization is performed by assigning an arbitrary vertex in the mesh with coordinates (0,0), and then integrating (summing) each of the two one-forms along the edges of the graph using, for example, a BFS or DFS traversal strategy to form 2D coordinates for every other vertex. Thus, every other vertex in the mesh is assigned 2D coordinates. Due to the closedness of the faces, these numbers are independent of the integration path.

In this embodiment, for the non-manifold case, reference is had to FIG. 2 which as described addresses the series of steps in connection with the manifold case. In the case of 3D non-manifold surfaces, the processing further removes and replaces all singularities that arise in the form of double wheels and/or doubly convex faces.

For non-manifold 3D surfaces, removing and replacing double wheels and/or doubly convex faces includes first identifying all double-wheel vertices and/or doubly convex faces. They can be identified by iterating over all faces, and determining if a vertex that is within diameter "k" of the face in 3D space lies inside the face in the 2D plane and is not connected to any of the triangle's vertices. If so, the region centered around the vertex is involved in either a double wheel or a doubly convex face. This technique is also referred to as the vertex-in-triangle test.

Figure 6A:
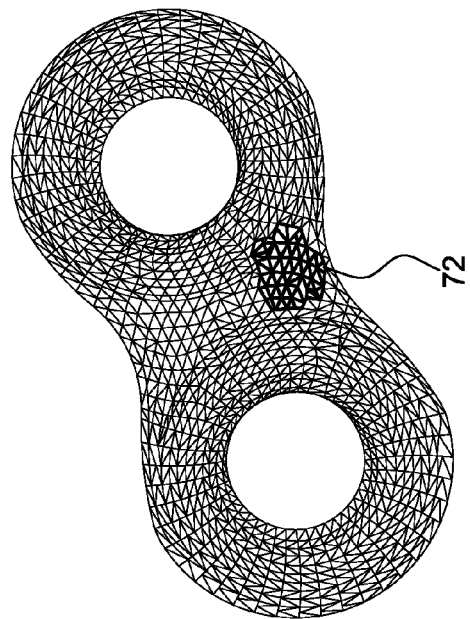
FIG. 6A illustrates an example 3D mesh surface of genus 2 having an example singularity.

Then the process continues by removing and replacing all vertices and faces connected to a singularity, and obtaining holes in the parameterization as well as a set of interior vertices for each hole (e.g., see FIG. 6A, 6B). Then, the process re-parameterizes each of the interior vertices in each hole by computing a 2D parameterization such as Tutte as shown in FIG. 2. A Tutte parameterization is computed by solving a linear system in which the coordinates of each interior vertex are some arbitrary convex combination of the position of its neighbors and the coordinates of the boundary vertices are coordinates of vertices of a convex polygon. By selecting a vertex along the boundary of each hole and traversing the hole's boundary and checking for which faces are not covered by a face on each side, the set of boundary vertices for each hole is computed. A Tutte parameterization for the boundary and interior vertices of each hole can be computed by assigning each boundary vertex coordinates along a circle, the linearly system just described is solvable. Then, there is next employed the step of polygonalizing the point sets in each hole in order to provide a polygonalized 2D surface to cover the holes.

From the above described methodology, 3D Surface matching and 3D Surface Morphing can now be performed in 2D.

Thus, after parameterization according to the methodology described herein, a correspondence function is computed which is used for applications such as computing a surface deformation from two parameterized 3D meshes.

This example application involves correlating two surface patches through a non-rigid spatial deformation such that corresponding regions of one surface are mapped onto regions of the second surface. This is achieved by matching parameter domains. Surface deformation is viewed as pressing one surface into a mould of a second surface. Various stresses induced by stretching, bending and compression occur as the surface is being pressed. An energy defined on the deformations from one parameter space to the other can measure these stresses. The method 100 for constructing the surface deformation from two parameterized surfaces of genus "g" is depicted in FIG. 7.

First as depicted at 105, FIG. 7, there is input two parameterized 3D meshes obtained as a result of the global parameterization techniques described herein. Then, at step 110, for each input parameterized 3D mesh, there is formulated a discrete deformation function (e.g., finite element discretization). The matching energy defined as a quantity that represents the similarity between the two surfaces for computing the surface deformation is based on any number of quantities such as the curvature, surface area, the amount of signal variation in the parameterized surface (also referred to as signal stretch) and the amount if geometric variation in the parameterized surface (also referred to as geometric stretch). These quantities can be discretized in the 2D domain using a sampling technique, for example. Then, as depicted at 115, the deformation is optimized using 2D image processing techniques. Any one of a number of image processing algorithm(s) may be implemented at this step (see for example, the reference to Alvarez L., et al. entitled "A scale-space approach to nonlocal optical flow calculations" in Second International Conference, Scale-Space '99 (September 1999), Lecture Notes in Computer Science; 1682, pp. 235-246. Finally, a resulting discrete surface matching deformation is output at 120.

A method 150 for constructing the surface deformation from two parameterized surfaces of genus g is depicted in FIG. 8. Particularly, FIG. 8 depicts the method 150 for constructing a correspondence function for computing a surface deformation from two parameterized 3D meshes representing 3D objects of genus g obtained as a result of the global parameterization techniques described herein above. In the specific example shown in FIG. 8, at step 155, two parameterized 3D meshes obtained after parameterization according to the methodology described herein are input to a processing system such as a computer device. Then, at step 160, for each mesh, there is performed scan converting the surface triangulation in the parameter domain. A scan conversion algorithm renders the image of geometric primitive by setting pixel colors inside the primitive typically by interpolating the color specified at the vertices of the primitive. Then, as depicted at 165, a finite element discretization is applied and the deformation is optimized using 2D image processing techniques. Any one of a number of algorithm(s) to minimize energy functional in 2D images may be implemented at this step such as fine-to-coarse and coarse-to-fine techniques. Finally, a resulting discrete surface matching deformation is output at 170.

Further, after parameterization according to the methodology described herein, a correspondence function is computed which is used for surface matching applications from two parameterized 3D meshes. FIG. 9 summarizes the steps 200 for matching two surfaces after parameterizing them in 2D.

To match two surfaces first involves computing spin-images from the input two parameterized 3D meshes 205. Spin images are localized descriptions of the global shape of a surface and are invariant to rigid transformations. Given a user defined metric for matching, areas in the two surfaces with high metric variation can be identified, and their spin images generated at 210. If no user defined metric is provided, then metrics may be used such as (but not limited to) signal variation or geometric stretch. Spin-images (such as obtained by techniques described in the reference to A. Johnson and M. Hebert entitled "Using spin images for efficient object recognition in cluttered 3d scenes" PAMI, 21:433-449, 1999) may be used to obtain corresponding feature "f" point sets (e.g., 3D point sets) between the two surfaces 215. That is, for each input mesh, for each common feature "f" found in each mesh, a 3D point set identifying the common feature is generated. Then, at 220, there is computed, for each common feature, a normalized correlation coefficient and similarity criterion between the two surfaces. That is, at step 220, for each common feature f, there is parameterized the point sets $f_A$ in parameterized mesh A and point sets $f_B$ in parameterized mesh B and a normalized correlation coefficient and similarity criterion $s(f_A, f_B)$ is computed. Then there is performed, at step 220, adding a computed "s" to a running sum s(A,B) where s(A,B) is the sum of the similarity criterions for all the feature sets $f_A$ and $f_B$.

One technique for computing a normalized correlation coefficient and similarity criterion for each common feature between the two surfaces is described in the reference to Johnson entitled "Spin-Images: A Representation for 3D Surface Matching," PhD thesis, Robotics Inst., Carnegie Mellon Univ., 1997. This measure of similarity can be added to a running sum S(A,B), and the sum of the similarity criteria used over all the feature sets as an indicator of how closely the surfaces resemble each other. That is, the output 225 of the matching algorithm of FIG. 4 is the running sum S(A,B) similarity criterion that compares all the common features of both surfaces.

Figure 10:
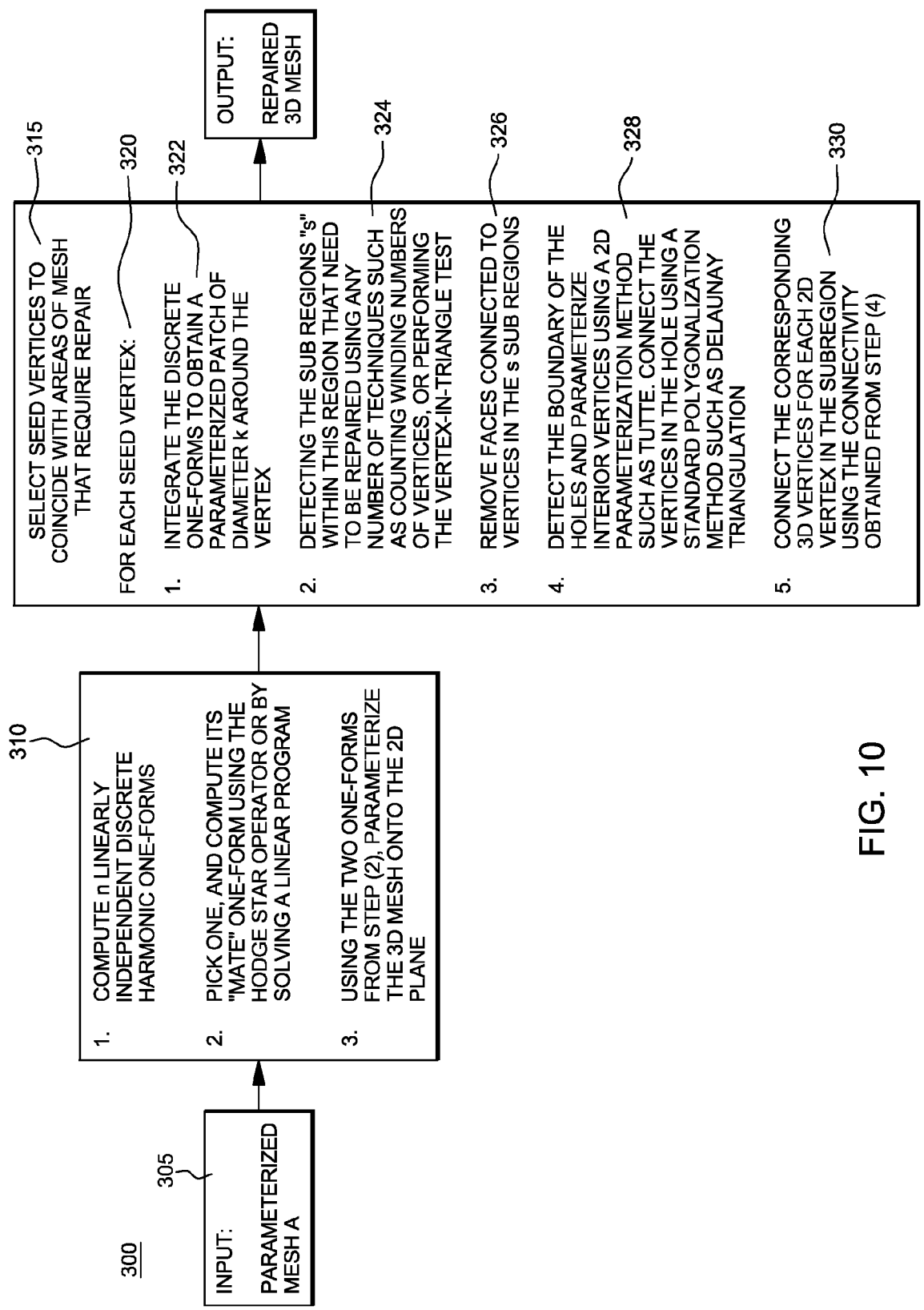
FIG. 10 summarizes the steps for repairing a 3D mesh after parameterizing it using the method of the present invention; and, FIG. 11 is a block diagram of an exemplary computing environment in which this invention may be implemented.

FIG. 10 shows how the present invention can also be used to repair meshes of arbitrary genus. Mesh repair refers to the filling of holes in a 3D surface or replacement of incorrect geometry. As shown in FIG. 10, the following method steps are invoked to perform mesh repair 300: Given an input mesh at step 305 where regions of the mesh have awry triangles or missing triangles, n discrete one-forms of the mesh are computed at step 310 using the method described herein above in connection with step 30, FIG. 2. From this set of one-forms, a one-form is selected and a "mate" one-form is computed using the method described herein above in connection with step 30, FIG. 2. Subsequently, at step 315, there is performed the step of picking a number of seed vertices. The seed vertices are picked to coincide with regions of the mesh that need to be repaired, or they could be user defined, or they could be set randomly. Then, as indicated in loop 320, for each seed vertex, the following steps are performed: Integrating the discrete one-forms to obtain a parameterized patch of diameter k of the mesh (322); Detecting the sub regions "s" within this region that need to be repaired including areas that arise as singularities as a result of the parameterization; Doing the repairing using any number of techniques (324), such as counting winding numbers of vertices, or performing the vertex-in-triangle test. The vertex in triangle test involves iterating over all faces, and performing a check to see if a vertex that is within diameter k of the face in 3D space, lies inside the face in the 2D plane and is not connected to any of the triangle's vertices. The s sub regions can be repaired using the technique outlined herein above that involves removing and replacing the faces connected to vertices in each subregion. For example, at 326, all faces in the mesh connected to a vertex in each subregion are removed to obtain holes in the parameterization as well as a set of interior vertices for each hole. Each of the interior vertices in each hole can be re-parameterized by computing a 2D parameterization (328) such as Tutte by solving a linear system in which the coordinates of each interior vertex are some arbitrary convex combination of the position of its neighbors and the coordinates of the boundary vertices are coordinates of vertices of a convex polygon. By selecting a vertex along the boundary of each hole and traversing the hole's boundary and checking for which faces are not covered by a face on each side, the set of boundary vertices for each hole is computed. Each boundary vertex is assigned coordinates along a circle, to solve the linear system. Then, the point sets in each hole are polygonalized (330), i.e., in order to provide a polygonalized 2D surface to cover the holes. In one embodiment, the vertices in the hole are connected using a standard polygonalization method such as Delaunay Triangulation that renders each face as a triangle.

In sum, by utilizing a global parameterization method based on discrete harmonic one-forms, according to the invention, a mapping of 3D surface into 2D produces a numerical measure of similarity between two 3D surfaces that are mapped to 2D using the method. Further, the mapping into 2D produces a correspondence that allows one 3D surface to be mapped to a second 3D surface or vice versa, when both surfaces are mapped into 2D. The mapping of a 3D surface into 2D according to the method of the invention allows one to repair a topologically incorrect surface when it is mapped into 2D. Additionally, the mapping of a manifold surface to 2D is obtained in a locally non-overlapping manner and, further, such that the mapping of the manifold surface to 2D isolates the distortion introduced by a global mapping to a finite number of locations in 2 dimensions (the distortion consisting of overlapping triangles that wind around a vertex or face twice).

Moreover, by utilizing a global parameterization method based on discrete harmonic one-forms, according to the invention, a matching algorithm, has the following benefits: 1) The algorithm can compare surfaces of different resolution; 2) The algorithm is more robust to noise in the input models than other known solutions; 3) The algorithm does not require specification of the mesh boundary; 4) the algorithm does not require the polygons in the input surface to be triangles and does not require restrictions on the angles of the mesh polygons; and 5) The algorithm does not require alignment normalization or similarity transformation invariance, both of which are necessary for computing accurate shape descriptors for 3D models.

Moreover, by reducing the problem of determining correspondences between three dimensional surfaces of arbitrary genus to two dimensions, the present invention makes it more feasible to implement 2D image processing techniques for establishing correspondences that would not be feasible in 3D. This leads to several advantages, including, but not limited to: 1) The method is more memory efficient than other methods for determining correspondence since it parameterizes the 3D surface into 2D and performs all operations in 2D; and, 2) This method decouples the resolution of the input mesh from the resolution utilized in the parameter domain. In two dimensions, one can sample at higher sampling rates, regardless of the resolution of the 3D mesh initially provided.

Thus, as a result of implementing the methodology for performing global parameterization or flattening of a 3D surfaces into 2D, there is obtained faster and more accurate results for matching 3D surfaces. For example, searching for and matching 3D surfaces in 3D virtual worlds software applications and in online websites that sell products using 3D models. That is, as a result, the method produces more accurate results for matching 3D surfaces and accomplishes matching of any two 3D surfaces faster than current methods. 3D surface matching is important and necessary for searching for a model in a database that is similar to one that a user has selected. This has applications in 3D Virtual World software, and online websites that sell products like clothes using 3D graphics software. 3D surface matching is also important in computer games that allow the user to model the game's characters in real-time and require the user to search quickly through a database of models to find a match to a model they selected.

Furthermore, the methodology for performing global parameterization or flattening of a 3D surfaces into 2D according to the invention, does not introduce inaccuracies which may be important for artistic manipulation of 3D surfaces and 3D mesh repair which may be useful for applications in the computer animation movie Industry, computer games industry, and 3D modeling software industry. Furthermore the methodology does not introduce inaccuracies in the input data that represents the 3D input surfaces. As a result of this, the method for performing global parameterization or flattening of a 3D surfaces into 2D according to the invention may be used for artistic manipulation and mesh repair that current global parameterization methods cannot be used for. Users in the animation movie industry or computer games industry frequently wish to artistically manipulate meshes by adding features, textures, and changing the geometry. Mesh repair is an extremely important tool for any 3D graphics software that needs to manipulate 3D surface models that are 3D scans of real-life objects obtained from 3D scanners. The scanned-in models of the real-life objects frequently are missing or have extraneous triangles, edges or vertices and are not mathematically perfect. Therefore having access to an accurate and fast method for mesh repair, such as in the system and method of the present invention, is invaluable.

Moreover, method for performing global parameterization or flattening of a 3D surfaces into 2D according to the invention can work with a wide variety of 3D models which is important for surface matching, artistic manipulation of 3D surfaces and 3D graphics modeling software. Additionally, for all these applications requiring mesh repair and artistic manipulation of meshes, the methodology of the invention is applied to a larger variety of surface representations (there are no constraints on the geometry of the meshes that represent the input surfaces. Current methods for global parameterization impose constraints on the input mesh such as restrictions on an acceptable size of the angles between adjacent sides of polygons of input surface meshes). The feature afforded by this methodology is important for 3D graphics software that must ingest, modify and output any kind of 3D model and is also important for surface matching.

Furthermore, the method does not introduce inaccuracies when the 3D input surfaces has arbitrary geni (number of holes). Arbitrary genus means zero, one or greater than one hole in the surface. Thus, this is important for 3D surface matching, 3D mesh repair and 3D surface artistic manipulation, for industries including, but not limited to: 3D virtual worlds software industry, online websites that sell products using 3D models, 3D surface modeling software industry, computer games industry, and computer animation movie industry. The method for performing global parameterization or flattening of a 3D surfaces into 2D according to the invention further isolates the distortion introduced by a global mapping of a surface of arbitrary genus to the 2D plane to a finite number of places in the 2D plane. This distortion consists of overlapping triangles that wind around a vertex or face twice. As current global parameterization methods do not guarantee that this distortion will be isolated to a finite number of places, as a result, current techniques employ time consuming algorithms to search for the distortion introduced by the mapping and if the distortion covers a large proportion of the input surface, current methods will fail. Furthermore current techniques may fail to locate all the distortion in the 2D plane because it is spread arbitrarily, and thus introduce overlapping triangles that wind around a vertex or face twice in the surface. Therefore, by limiting the distortion to a finite number of places, the method of the invention is guaranteed to locate and eliminate this distortion. As a result, the method of the invention will not introduce any overlapping triangles that wind around a vertex or face twice, and thus is more accurate than existing global parameterization and can be applied to novel applications such as 3D surface matching, 3D mesh repair and 3D surface artistic manipulation.

The method of the present invention will be generally implemented by a computer executing a sequence of program instructions for carrying out the steps of the method and may be embodied in a computer program product comprising media storing the program instructions. For example, FIG. 11 and the following discussion provide a brief general description of a suitable computing environment in which the invention may be implemented. It should be understood, however, that handheld, portable, and other computing devices of all kinds are contemplated for use in connection with the present invention. While a general-purpose computer is described below, this is but one example and the present invention may be implemented in an environment of networked hosted services in which very little or minimal client resources are implicated, e.g., a networked environment in which the client device serves merely as a browser or interface to the World Wide Web.

Although not required, the invention can be implemented via an application-programming interface (API), for use by a developer, and/or included within the network browsing software, which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 11, thus, illustrates an example of a suitable computing system environment 400 in which the invention may be implemented, although as made clear above, the computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

With reference to FIG. 11, an exemplary system for implementing the invention includes a general purpose-computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 410.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 11 illustrates operating system 434, application programs 435, other program modules 436, and program data 437.

The computer 410 may also include other removable/non-removable, volatile/nonvolatile computer storage media. By way of example only, FIG. 11 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 11 provide storage of computer readable instructions, data structures, program modules and other data for the computer 410. In FIG. 11, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB).

A monitor 491 or other type of display device is also connected to the system bus 421 via an interface, such as a video interface 490. A graphics interface 482, such as Northbridge, may also be connected to the system bus 421. Northbridge is a chipset that communicates with the CPU, or host-processing unit 420, and assumes responsibility for accelerated graphics port (AGP) communications. One or more graphics processing units (GPUs) 484 may communicate with graphics interface 482. In this regard, GPUs 484 generally include on-chip memory storage, such as register storage and GPUs 484 communicate with a video memory 486. GPUs 484, however, are but one example of a coprocessor and thus a variety of co-processing devices may be included in computer 410. A monitor 491 or other type of display device is also connected to the system bus 421 via an interface, such as a video interface 490, which may in turn communicate with video memory 486. In addition to monitor 491, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 11. The logical connections depicted in FIG. 11 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 11 illustrates remote application programs 485 as residing on memory device 481. It will be appreciated that the network connections shown are exemplary and other means of establishing a communications link between the computers may be used.

One of ordinary skill in the art can appreciate that a computer 410 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method implemented in a computer system for parameterizing a 3D surface of genus g and arbitrary topology to the 2D plane comprising:
    receiving, at said computer system, an input 3D mesh of genus g, said 3D mesh representing a 3D arbitrary angle sized surface, said 3D arbitrary angle sized surface being a manifold 3D surface or non-manifold 3D surface;
    computing n discrete harmonic one-forms on the surface of the mesh to obtain n numbers for every edge in the graph represented by an input mesh, wherein 2g discrete harmonic one-forms are found in the 3D manifold surface, or less than 2g discrete harmonic one-forms or more than 2g discrete harmonic one-forms are found in the 3D non-manifold surface;
    selecting two compatible linearly independent discrete harmonic one-forms for parameterization;
    assigning an arbitrary vertex in the mesh as an origin, and then summing each of the two harmonic one-forms along the edges of the graph using a graph traversal strategy to form 2D coordinates for every other vertex of said mesh to form said 2D parameterization of said 3D surface;
    detecting all singularities in said 2D parameterization; and,
    removing and replacing the singularities, said removing comprising removing faces connected to the singularity, and said replacing comprising parameterizing the vertices of the removed faces using a 2D parameterization method and connecting these vertices using a 2D polygonalization algorithm,
    wherein a program using a processor unit executes one or more of said computing selecting, assigning, detecting, removing and replacing.

2. The method implemented in a computer system as claimed in claim 1, wherein said detecting singularities in said 2D parameterization comprises identifying all double wheel vertices and doubly convex faces and other distortion.

3. The method implemented in a computer system as claimed in claim 2, wherein for the manifold surface, said detecting all double-wheel vertices comprises: traversing each vertex of said 2D parameterization and computing the winding number of each vertex, said double wheel existing at a vertex whose winding number is greater than 360 degrees.

4. The method implemented in a computer system as claimed in claim 2, wherein for the 3D surface of genus g, there are 2g–2 double wheel vertices and/or doubly-convex faces.

5. The method implemented in a computer system as claimed in claim 2, wherein for said non-manifold case, said detecting all double-wheel vertices comprises:
    iterating over all faces of said 2D plane; and,
    determining if a vertex that is within diameter k of the face in 3D space, lies inside the face in the 2D plane and is not connected to any of the triangle's vertices, and if so, identifying a region centered around the vertex as part of a double wheel vertex.

6. The method implemented in a computer system as claimed in claim 1 wherein said computing n discrete harmonic one-forms includes creating a matrix of equations representing the closedness of each vertex and co-closedness of each face in the input mesh, said discrete harmonic one-forms being generated by computing an orthogonal basis of the two dimensional null-space of said matrix.

7. The method implemented in a computer system as claimed in claim 1 wherein said selecting two compatible linearly independent discrete harmonic one-forms for parameterization comprises:
    randomly selecting a first discrete harmonic one-form from the 2g solutions; and,
    computing a mate one-form compatible with the first discrete harmonic one.

8. The method implemented in a computer system as claimed in claim 1, wherein said computing a mate one-form includes
    applying a Hodge Star operator; and
    applying a linear program specifying linear constraints to describe the mate one-form.

9. The method implemented in a computer system as claimed in claim 1, wherein said traversal strategy for forming said 2D coordinates includes one of: Breadth First Search and Depth First Search graph traversal strategies.

10. The method implemented in a computer system as claimed in claim 1, wherein said 2D parameterization method for parameterizing the vertices of the removed faces includes computing a Tutte parameterization.

11. A method implemented in a computer system for computing a surface deformation from two parameterized 3D meshes comprising:
    obtaining a 2D parameterization of each 3D mesh by:
        receiving, at said computer system, an input 3D mesh of genus g, said 3D mesh representing a 3D arbitrary angle sized surface, said 3D arbitrary angle sized surface being a manifold 3D surface or non-manifold 3D surface;
        said computer system configured for:
        computing n discrete harmonic one-forms on the surface of the mesh to obtain n numbers for every edge in the graph represented by an input mesh, wherein 2g discrete harmonic one-forms are found in the 3D manifold surface, or less than 2g discrete harmonic one-forms or more than 2g discrete harmonic one-forms are found in the 3D non-manifold surface;
        selecting two compatible linearly independent discrete harmonic one-forms for parameterization;

assigning an arbitrary vertex in the mesh as an origin, and then summing each of the two harmonic one-forms along the edges of the graph using a graph traversal strategy to form 2D coordinates for every other vertex of said mesh to form said 20 parameterization of said 3D surface;

detecting all singularities in said 2D parameterization; and, removing and replacing the singularities, said removing comprising: removing faces connected to the singularity and said replacing comprising: parameterizing the vertices of the removed faces using a 2D parameterization method and connecting these vertices using a 2D polygonalization algorithm; and, for each obtained parameterized 3D mesh, formulating a discrete deformation function by scan converting a surface;

optimizing said deformation function using an 2D image processing technique; and, outputting a resulting discrete surface matching deformation, wherein a program using a processor unit executes one or more of said computing selecting, assigning, detecting, removing, replacing and formulating, optimizing and outputting.

12. The method implemented in a computer system for computing a surface deformation as claimed in claim 11, wherein said optimizing said deformation function using a 2D image processing technique includes minimizing an energy functional in 2D images.

13. The method implemented in a computer system for computing a surface deformation as claimed in claim 11, wherein said detecting singularities comprises identifying all double wheel vertices in said 2D parameterization.

14. The method implemented in a computer system for computing a surface deformation as claimed in claim 13, wherein for the manifold case, said detecting all double-wheel vertices comprises:

traversing each vertex of said 2D parameterization and computing the winding number of each vertex, said double wheel existing at a vertex whose winding number is greater than 360 degrees; and, wherein for said non-manifold case, said detecting all double-wheel vertices and/or doubly convex faces comprises:

iterating over all faces of said 2D plane; and, determining if a vertex that is within diameter k of the face in 3D space, lies inside the face in the 2D plane and is not connected to any of the polygon's vertices, and if so, identifying a region centered around the vertex as part of a double wheel vertex or a doubly convex face or other distortion introduced by the 2D parameterization.

15. A method implemented in a computer system of matching surfaces of two 3D objects comprising:

providing a user-defined metric for matching;

obtaining a 2D parameterization of a 3D mesh associated with each 3D object by:

receiving, at said computer system, an input 3D mesh of genus g;

computing n discrete harmonic one-forms on the surface of the mesh to obtain n numbers for every edge in the graph represented by an input mesh;

selecting two compatible linearly independent discrete harmonic one-forms for parameterization;

assigning an arbitrary vertex in the mesh as an origin, and then summing each of the two harmonic one-forms along the edges of the graph using a graph traversal strategy to form 2D coordinates for every other vertex of said mesh to form said 2D parameterization of said 3D surface;

detecting all singularities in said 2D parameterization; and, removing and replacing the singularities, said removing comprising: removing faces connected to the singularity and said replacing comprising: parameterizing the vertices of the removed faces using a 2D parameterization method and connecting these vertices using a 2D polygonalization algorithm; and, for each obtained parameterized 3D mesh, generating one or more spin-images, using said user-defined metric, by identifying areas in the two 3D surfaces having high metric variation;

obtaining, via said generated spin-images, corresponding feature "f" point sets between the two surfaces;

computing, for each common feature "f" found in each mesh, a normalized correlation coefficient and similarity criterion "s" between the two surfaces; and, providing a running sum "S" of said similarity criteria used over all the feature sets as an indicator of each surface's resemblance to each other, wherein a program using a processor unit executes one or more of said computing n discrete harmonic one-forms, selecting, assigning, detecting, removing, replacing, generating, obtaining, computing a normalized correlation coefficient and providing steps.

16. The method implemented in a computer system of matching surfaces of two 3D objects as claimed in claim 15, wherein said feature point sets comprises a 3D point set used for identifying the common feature.

17. The method implemented in a computer system of matching surfaces of two 3D objects as claimed in claim 15, wherein said computing of said similarity criterion between the two surfaces comprises:

for each common feature f, parameterizing the point sets f in each 2D parameterization mesh to compute a normalized correlation coefficient and computing similarity criterion s, wherein said similarity criterion s is added to said running sum S.

18. The method implemented in a computer system of matching surfaces of two 3D objects as claimed in claim 15, wherein a user-defined metric includes a signal variation or a geometric stretch.

19. A computer program product for parameterizing a 3D surface of genus g and arbitrary topology to the 2D plan; the computer program product comprising:

a storage medium readable by a processing circuit and storing instructions for execution by the processing circuit for performing a method comprising:

receiving, at said computer system, an input 3D mesh of genus g, said 3D mesh representing a 3D arbitrary angle sized surface, said 3D arbitrary angle sized surface being a manifold 3D surface or non-manifold 3D surface;

computing n discrete harmonic one-forms on the surface of the mesh to obtain n numbers for every edge in the graph represented by an input mesh, wherein 2g discrete harmonic one-forms are found in the 3D manifold surface, or less than 2g discrete harmonic one-forms or more than 2g discrete harmonic one-forms are found in the 3D non-manifold surface;

selecting two compatible linearly independent discrete harmonic one-forms for parameterization;

assigning an arbitrary vertex in the mesh as an origin, and then summing each of the two harmonic one-forms along the edges of the graph using a graph traversal strategy to form 2D coordinates for every other vertex of said mesh to form said 2D parameterization of said 3D surface;

detecting all singularities in said 2D parameterization; and, removing and replacing the singularities, said removing comprising: removing faces connected to the singularity and said replacing comprising: parameterizing the vertices of the removed faces using a 2D parameterization method and connecting these vertices using a 2D polygonalization algorithm.

20. The computer program product as claimed in claim 19, wherein said detecting singularities comprises identifying all double wheel vertices in said 2D parameterization.

21. The computer program product as claimed in claim 20, wherein for the manifold case, said detecting all double-wheel vertices comprises:

traversing each vertex of said 2D parameterization and computing the winding number of each vertex, said double wheel existing at a vertex whose winding number is greater than 360 degrees; and, wherein for said non-manifold case, said detecting all double-wheel vertices comprises:

iterating over all faces of said 2D plane; and, determining if a vertex that is within diameter k of the face in 3D space, lies inside the face in the 2D plane and is not connected to any of the polygon's vertices, and if so, identifying a region centered around the vertex as part of a double wheel vertex.

22. A method implemented in a computer system of repairing a 3D mesh representing a 3D object comprising:

obtaining a 2D parameterization of said 3D mesh associated with a 3D object by;

receiving an input 3D mesh of genus g;

computing n discrete harmonic one-forms on the surface of the mesh to obtain n numbers for every edge in the graph represented by an input mesh;

selecting two compatible linearly independent discrete harmonic one-forms for parameterization; and, assigning an arbitrary vertex in the mesh as an origin, and then summing each of the two harmonic one-forms along the edges of the graph using a graph traversal strategy to form 2D coordinates for every other vertex of said mesh to form a 2D mesh parameterization of said 3D surface;

selecting seed vertices to coincide with areas of mesh that require repair; and, for each seed vertex selected:

integrating said discrete one-forms to obtain a parameterized patch of diameter k around the vertex;

detecting sub regions "s" within the mesh area to be repaired;

removing faces connected to the s sub regions; and, detecting the boundary of the holes and parameterizing interior vertices by using a 2D parameterization method;

connecting the vertices in the hole using a polygonalization method; and, connecting corresponding 3D vertices for each 2D vertex in the subregion using said in hole vertices connectivity, wherein a program using a processor unit executes one or more of said computing selecting, assigning, selecting seed vertices, integrating, detecting sub regions, removing faces, detecting the boundary of the holes, said connecting of the vertices and connecting corresponding 3D vertices.

23. The method implemented in a computer system of repairing a 3D mesh as claimed in claim 22, wherein said detecting sub regions within the mesh area to be repaired comprises one of: a counting winding numbers of vertices, or performing a vertex-in-triangle test.

* * * * *